United States Patent

[11] 3,609,241

[72] Inventor Alton F. Riethmeier
Rochester, N.Y.

[21] Appl. No. 644,682
[22] Filed June 8, 1967
[45] Patented Sept. 28, 1971
[73] Assignee Xerox Corporation
Rochester, N.Y.

[54] ELECTRONIC COUPLER CIRCUIT
8 Claims, 5 Drawing Figs.

[52] U.S. Cl. .......... 179/4, 178/6.6 R
[51] Int. Cl. .......... H04m 11/06
[50] Field of Search .......... 178/6.6, 6.6 A; 179/2, 2 DP, 3, 4; 340/213.1, 226, 408

[56] References Cited

UNITED STATES PATENTS

| | | | |
|---|---|---|---|
| 3,428,749 | 2/1969 | Gray | 179/4 |
| 2,843,660 | 7/1958 | Franklin et al. | 179/2 DP |
| 2,903,517 | 9/1959 | Ridings | 179/4 |
| 3,076,056 | 1/1963 | Stoffels | 179/3 |
| 3,084,213 | 4/1963 | Lemelson | 179/4 X |
| 3,113,176 | 12/1963 | Doktor et al. | 179/3 X |

*Primary Examiner*—Kathleen H. Claffy
*Assistant Examiner*—William A. Helvestine
*Attorneys*—Ronald Zibelli, James J. Ralabate and Norman E. Schrader

ABSTRACT: An electronic coupler for converting facsimile graphic communication information signals directly applicable to be transmitted over direct distance dialing telephone lines, and vice versa. In the automatic unattended transmit or receive modes, the coupler automatically answers a call made over the direct distance dialing telephone lines and after proper handshaking signals commences the transmitting or printing operation. In the attended mode, switching to transmit or receive provisions can be made upon operator decision of document transmission during a normal telephone conversation with equipment coupled to the coupler and the telephone lines.

INVENTOR.
ALTON F. RIETHMEIER
BY Ronald Zibelli
Franklyn C. Weiss
ATTORNEYS

INVENTOR.
ALTON F. RIETHMEIER
BY Ronald Zibelli
Franklyn C. Weiss
ATTORNEYS

INVENTOR.
ALTON F. RIETHMEIER
BY Ronald Zebelli
Franklyn C. Weiss
ATTORNEYS

INVENTOR.
ALTON F. RIETHMEIER
BY Ronald Zibelli
Franklyn C. Weiss
ATTORNEYS

ELECTRONIC COUPLER CIRCUIT

BACKGROUND

In a normal facsimile system, a document to be transmitted is scanned at a transmitting station to convert information on the document into a series of electrical signals. These video signals, or carrier-modulated signals corresponding thereto, are then coupled to the input of a communication link interconnecting the transmitter with a receiver. At a receiving location, the video signals, in conjunction with suitable synchronizing signals, selectively control the actuation of appropriate marking means to generate a facsimile of the document transmitted. In the field of facsimile communication technology, many facsimile machines rare presently being marketed. One such unit is the Xerox Telecopier which is a facsimile transceiver capable of transmitting or receiving a document when placed in the proper mode. The Telecopier unit is manufactured and marketed by the Xerox Corporation in Rochester New York. Transmission of a document by the Telecopier takes in the order of 6 minutes over an acoustically coupled telephone line. A similar Telecopier unit at the other end of the line would be reached by direct distance telephone dialing and when placed in the receive mode would recreate a facsimile of the document transmitted.

The inherent disadvantage to acoustically coupled facsimile systems utilizing direct distance dialing telephone lines is the fact that the telephone handset, after the call has been put through to the receiving location, must physically be placed on the acoustic coupler prior to information transmission. This physical movement of the telephone handset requires the presence of an operator at both the transmitting and receiving locations for document transmission to take place. If, for instance, a facsimile transceiver unit at a central location is the receiving unit for several transmitting locations, the present system requires that an operator be situated at the receiving location to answer each and every call over the direct distance dialing network and placement of the telephone handset on the transceiver acoustic adapter prior to transmission of the document to that location. Inasmuch as the telephone rates decrease after the normal business hours of the day are over, it is desirable to use this time for transmission of information to the separate locations after the normal business day is over. For instance, several outlying sales offices could transmit the day's orders or receipts to the central location during the off-time low-rate time period for processing by the central office at the start of work the next business day. The fact that an operator must be present for the system as presently marketed defeats the advantage of utilizing the low-cost telephone service during the offpeak business hours.

OBJECTS OF THE INVENTION

It is, accordingly, an object of the present invention to optimize the information handling capability between a facsimile communication system and the transmission medium.

It s another object of the present invention to provide an electrical interface unit between a facsimile communication system and the transmission media.

It is another object of the present invention to provide unattended operation of a facsimile transceiver system It is another object of the present invention to provide automatic transmit capability of an unattended facsimile transceiver unit at one input to a transmission line.

It is another object of the present invention to provide automatic receive capability of a facsimile transceiver unit at the output of a transmission line.

It is another object of the present invention to provide manual transmit and receive capability of document transmission after establishing communication by the ordinary telephone direct distance dialing system.

BRIEF SUMMARY OF THE INVENTION

In accomplishing the above and other desired aspects, Applicant has invented novel apparatus for providing direct unattended connection between a facsimile transceiver unit and the information transmission medium. The electronic coupler of the present invention is coupled between a facsimile transceiver unit and the information transmission medium which could be the direct distance dialing common carrier telephone system. The electrical interface unit provides for switching between the coupler and a telephone unit for providing electronic or audio communication through the transmission medium. The electronic coupler is capable of operating in three modes. The automatic transmit and automatic receive modes allow the automatic transmission or automatic receiving of a document which has been preset for such condition for later transmission when an operator is not present or is busy. The third mode is the attended mode, if and when during the normal telephone conversation it is desired to transmit manually a document in either direction.

DESCRIPTION OF THE DRAWINGS

For a more complete understanding of Applicat's invention reference may be had to the following detailed description in conjunction with the drawings wherein.

DETAILED DESCRIPTION OF THE INVENTION

Figures 1, 2:
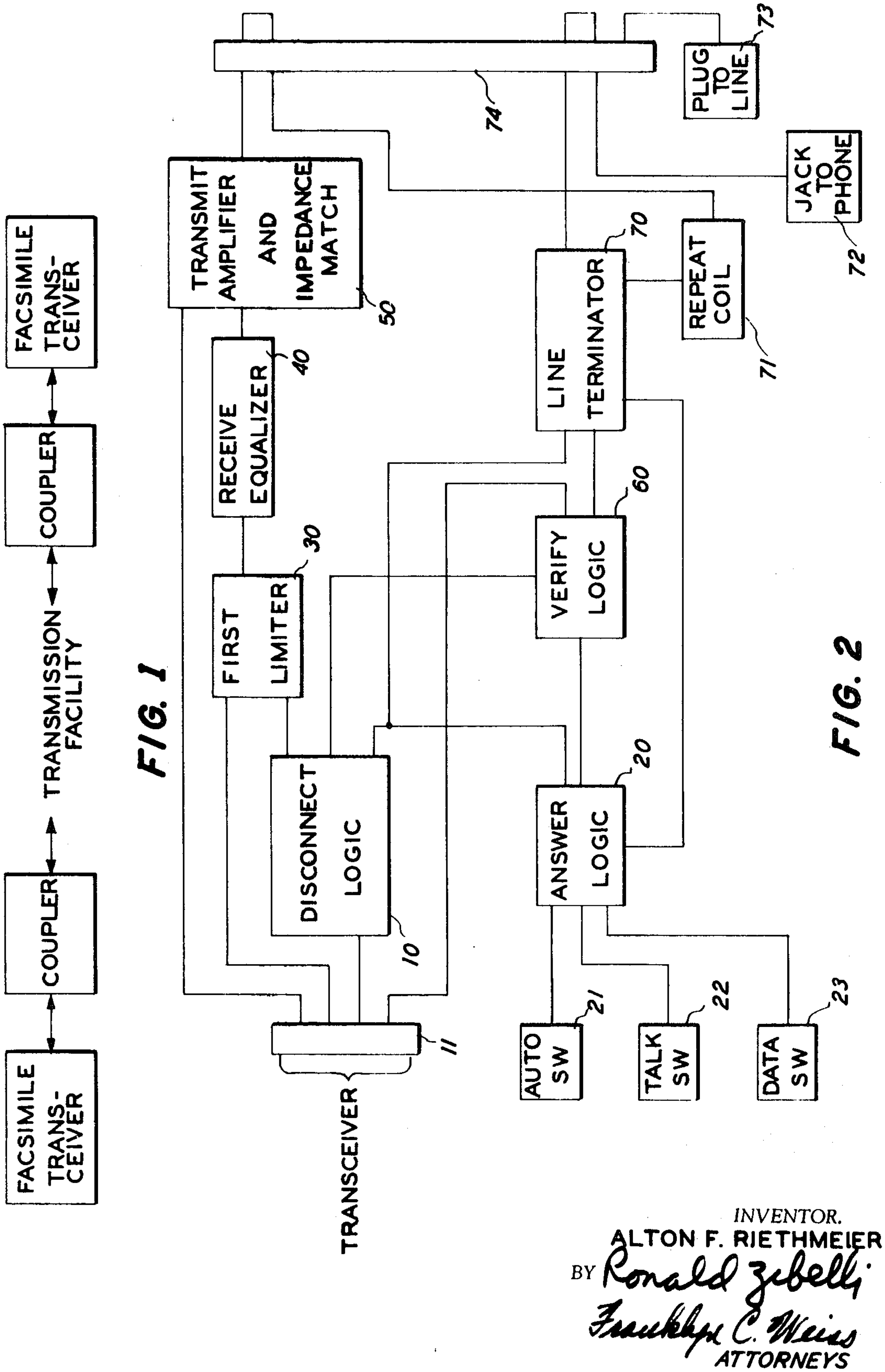
FIG. 1 is a block diagram of a facsimile system showing the placement of the electronic coupler of the present invention.
FIG. 2 is a block diagram of the internal circuitry of the electronic coupler in accordance with the principles of the present invention.

Referring now to FIG. 1, there is shown the block diagram of the system including facsimile transceivers and couplers to the transmission facility. The facsimile transceiver utilized in the transmit function would scan a document or the like to generate a series of video signals representative of the information on the document. These signals would be transferred to a coupler which is utilized to adapt the video signals for transmission over the transmission facility. The couplers known in the art are acoustic couplers and electronic couplers, in addition to direct electrical connection to the transmission line. The acoustic coupler is normally utilized whenever the common carrier telephone lines are to be used as the transmission medium. The facsimile transceiver would have associated with it a unit which is compatible for receiving a telephone handset in an acoustic relationship. Thus, the facsimile unit generates audio signals and by acoustic coupling to the telephone handset, transfers the information to the telephone system. At the other end of the telephone line, a similar acoustic coupler receives the transmitted information through the telephone handset for application by the facsimile transceiver being utilized as the printer.

The type of coupler is known as the electronic coupler wherein the facsimile video signals are electrically coupled to the transmission lines through the electronic circuitry of the coupler. Such couplers are generally termed in the art as data sets. Such data sets provide the necessary synchronizing and/or equalizing circuits for signal conversion between the mode compatible with the transceiver unit and a mode compatible for transmission over any of the known transmission lines such as telephone, microwave, radio, or direct wire.

In FIG. 2 is shown the electronic coupler such as can be utilized in FIG. 1, with unattended operation. That is, from a remote location, the coupler can be called through the direct distance dialing capabilities of the common carrier telephone network and the transceiver signalled to begin a send or receive operation with no operator in attendence. As can be seen in FIG. 2, attached to terminal board 74, is a jack 72 connected to an ordinary telephone handset for voice communication over the telephone line. Plug 73 also attached to terminal board 74 is utilized for attaching the electronic coupler to the input of the telephone link. Terminal board 11 is coupled to the facsimile transceiver unit for input and output transfer of data and other information.

The line terminator 70 includes circuitry for detecting the ring circuit when a call is made to the electronic coupler location. Other circuitry to be hereinafter more fully described is the line holding circuit used to enable the repeat coil 71 to hold the line open in the event that the telephone receiver remains or is replaced on its cradle on the telephone set. The verify logic 60 coupled o the line terminator 70 includes logic circuitry for the proper signal detection and generation to verify that a transceiver is on the line and in the correct mode to transmit or receive to or from the remote location and that a transceiver is at the other end of the line and not a wrong number or other type call. Answer logic 20 is utilized in conjunction with proper logic circuitry for providing signals in response to the auto switch 21, talk switch 22, and data switch 23, in conjunction with signals from the disconnect logic 10. The transmit amplifier and impedance match 50 are utilized for providing the proper impedance-matching provisions for the necessary and correct operation of the telephone system. Receive equalizer 40, amplitude and phase equalizes the received information signals for application to the first limiter circuit 30. This circuit 30 is utilized to detect the stop tone signals which are transmitted, in addition to the backstroke white signals, to be hereinafter more fully described. Disconnect logic 10 is utilized for disconnecting the coupler from the telephone line upon loss of certain signals or at the end of the message.

Figure 3A:
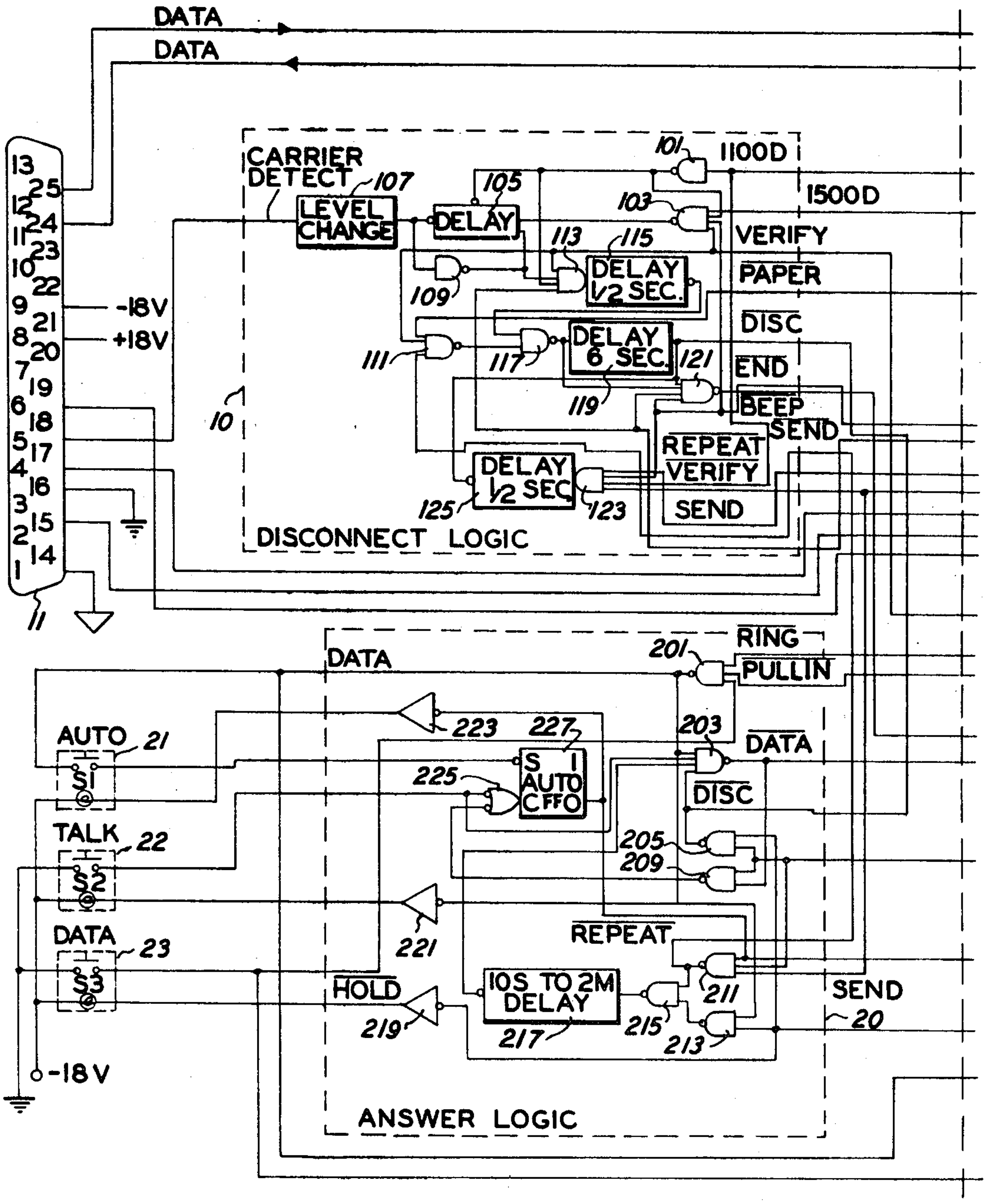
FIGS. 3A to 3C comprise the logic circuitry and interconnecting lines of the logic components shown in conjunction with FIG. 2.
Figure 3B:
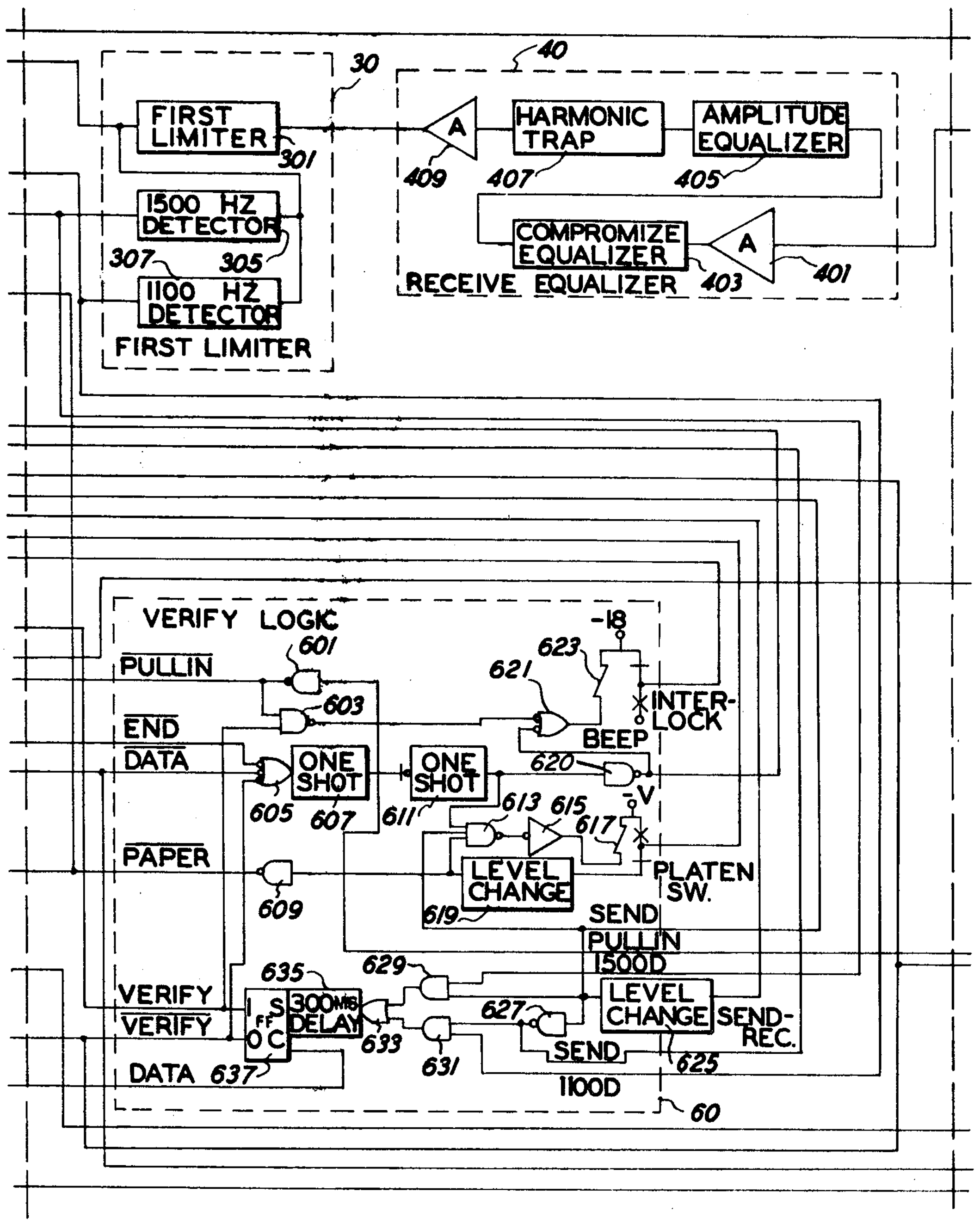
Figure 3C:
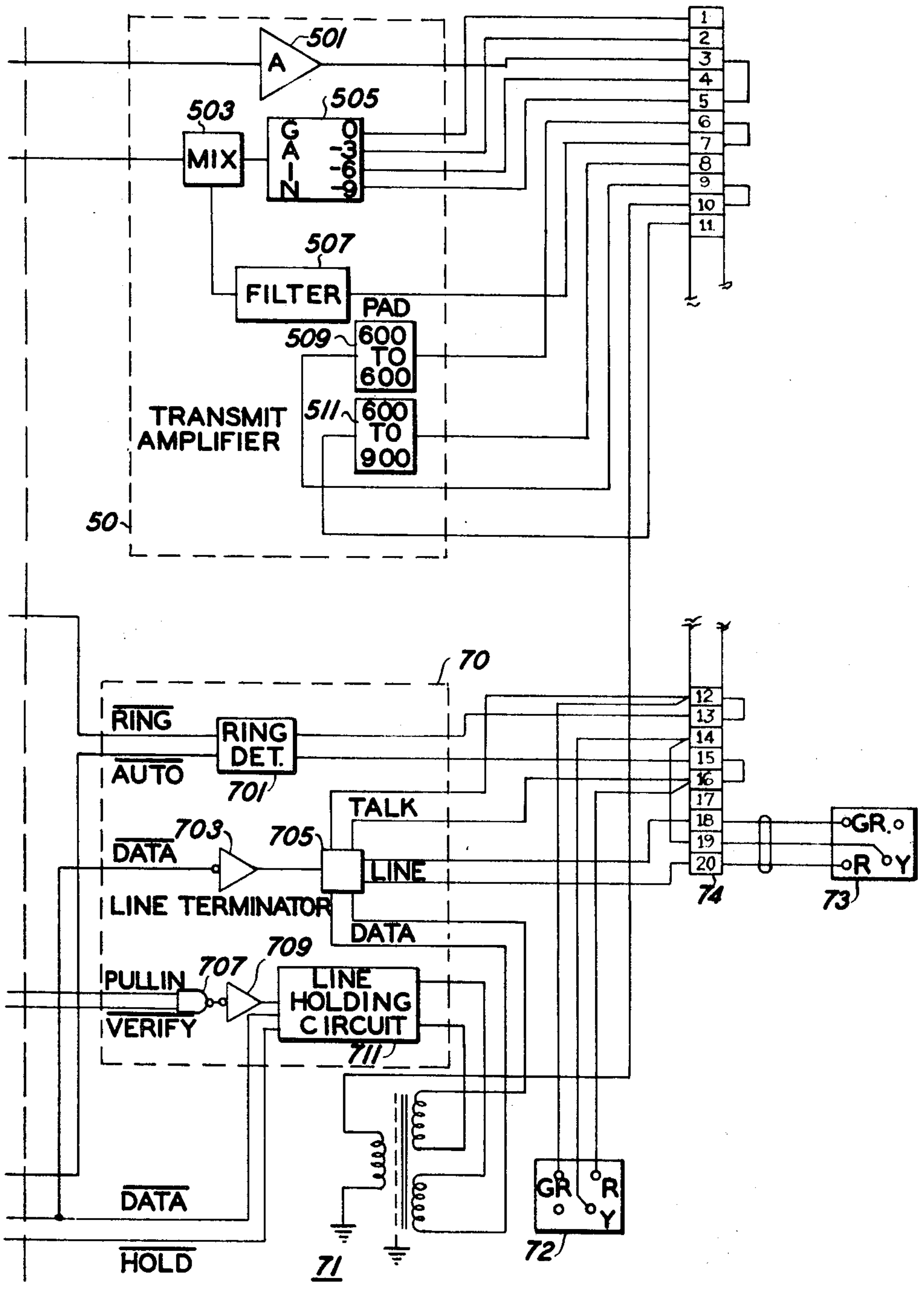

FIGS. 3A, 3B, and 3C show the complete circuitry and interconnecting wiring for the electronic coupler shown in FIGS. 1 and 2. The components number in FIG. 2 retain the same designations in FIG. 3. There are three separate modes in which the electronic coupler is capable of operating. The first mode is the automatic transmit in the unattended mode. This mode is utilized when it is desired to automatically transmit a document that has previously been loaded into the machine for later operation, such as inserting a document into the machine for later transmission during the evening when the telephone rates are lower. The second mode is the automatic receive mode when the transceiver is preset for the receive operation such as at a remote location where no operator is available or for night time operation, again when rates are lowest. The third mode is the attended mode, if and when during a normal telephone conversation it is desired to transmit a document in either direction.

If, for instance, the transceiver unit has been set up for unattended automatic receiving, an operator at the transmitting location would call over the common carrier telephone line the number of the location at which the receiving transceiver is located. The ringing current would then appear at the green and red terminals of plug 73, which is attached to terminals 18 and 20 of terminal board 74. This information has been transferred into the line terminator 70 to the line contacts of relay 705. If the coupler had been in the quiescent state, the contacts would be coupled to the talk terminals of the relay and thus the ringing current would be transferred back to terminal board 74 at terminals 12 and 16. As jack 72 is connected to an actual telephone handset, that phone would ring at this time. If, however, no operator is present, the coupler must determine electronically that the phone is ringing and that communication is desired with somebody at a remote location. Terminal 12 of terminal board 74 is shorted to terminal 13 as is terminal 15 shorted to terminal 16. Thus, the ringing current is coupled to ring detector 701, which, for example comprises a circuit to charge a capacitor upon detection of the ringing current. After a certain amount of rings, a signal is transferred to answer logic 20 in FIG. 3A. NAND gate 201 sees the ground potential condition of the ring indication which puts the output of the NAND gate at a logic one or +18 -volt condition. The signal appearing on the output of NAND gate 201 appears as an input to the auto switch 21 which, if it had been previously placed in the automatic position, would pass the signal therethrough and set flip-flop 227 in the answer logic 20. When this flip-flop sets, the O output goes to ground condition, which is transferred by inverter 223 to allow the auto switch indicator to be energized by the -18 volts applied to it.

For operation in the automatic receive mode, the facsimile transceiver and the coupler must have been preset in such a condition that they are ready to answer a call. That is, the transceiver itself must be loaded with blank paper for readout of a document the cover must be closed or other interlock switches activated with power on in the ready state. If the transceiver is the Telecopier, as hereinbefore set forth, then a high level appears on the interlock line to verify logic 60 through terminal board 11. If the transceiver is preset for an automatic receive operation, a low level appears on the send-receive line to verify logic 60 also through terminal board 11. These two signals indicate that paper is in the machine, the machine is closed, and power is on, which is sufficient to indicate that the transceiver is ready to either transmit or receive a document with the send-receive lead indicating which mode the transceiver is in.

If the transceiver is in the receive mode, and if paper is in the machine, flip-flop 227 in the answer logic 20 is enabled through the auto switch 21. That is, if there is no paper in the machine, the not paper line through level changer 619 and NAND gate 609 come into NAND gate 209 in the answer logic 20. If there is no paper in the transceiver, the output of NAND gate 209 is held to a low level which forces the flip-flop 227 to a reset or off condition. Thus, even if the auto button 21 is depressed, without paper in the transceiver, the flip-flop 227 cannot be set, thereby disabling the rest of the coupler circuitry.

If the flip-flop 227 is set, the panel light on the auto switch 21 is lit, as was hereinbefore set forth and the panel light on the talk switch 22 would be lit indicating that the telephone is still on line. The auto light, however, indicates that the transceiver is in a condition wherein if a call is received, it will be automatically answered. Thus, if the ring detector 701 detects the ringing current, a relay therein is closed which closed a path between the zero output side of the automatic flip-flop 227 and the set input to the data latch which comprises gates 201 and 203. A logic one appears at the output of NAND gate 201 indicating that the Telecopier is in the data mode, and by inverter 221 the +18 volts is converted to −18 volts thereby extinguishing the talk light. This indicates that the call has been answered but the coupler has not yet determined that it wants to transmit.

When a logic one appears on the data output line from NAND gate 201 a not data signal appears on the output of NAND gate 203. This signal fires one shot 607 through NOR gate 605. When one shot 607 is fired, the pullin signal through NAND gate 707, and inverter 709 in the line terminator 70, energizes a relay in the line-holding circuit 711. At the same time, the line-holding circuit relay is being enabled, the not data signal through inverter 703 is enabled and transfers the telephone line from the telephone to the coupler. Thus, with one shot 607 firing, the telephone line is transferred from the telephone set to the coupler circuitry which is held by the line-holding circuit 711.

The line-holding circuit relay being closed, passes the not data signal through the relay contact on the not hold line back to the answer logic 20 which latches the two gates 201 and 203 to make it form a flip-flop or latch giving the data indication and holding it in this state.

After one second the one shot 607 in the verify logic 60 times out, thereby firing one shot 611. During the time that one shot 611 is on, a 1,500-cycle tone indication signal is transmitted through NAND gate 620 and NOR gate 621 by closing the interlock switch 623. This signal passes over the interlock line to the transceiver which energizes a beep tone generator for transmission over the telephone line. At the same time that this is happening. NAND gate 213 in the answer logic 20 has two high-level signals on it, from the fact that the coupler has not as yet received verification. The output from NAND gate 213 is thus at a low condition which through NAND gate 215 triggers the 10 second to 2-minute disconnect timer 217, which is presettable for any time therebetween. Upon energization, the timer 217 begins timing for the preset delay. If verification is not received from the transmitting transceiver at the other end of the transmission line, the timer will time out, and reset gate 203 which resets the data latch, thereby releasing relay 705 in the line terminator 70 which transfers the telephone line back to the telephone. If, however, verification is received from the transmitting location before delay timer 217 has timed out, the timer is reset and no disconnect situation exists. The Telecopier and the coupler are now at a point where a 1,500-cycle beep tone has been transmitted, indicating that this location has answered and is waiting. Before any further operations can continue in the automatic receive mode, an 1,100 -cycle stop tone must be received. If the 1,100 -cycle tone is received, the detector 307 in the first limiter 30 emits a signal to the verify logic 60 to the input of AND gate 631. This signal is gated with the not send signal and after a 300-millisecond delay at 635 to insure that the stop tone signal is actually the signal detected, the verify flip-flop 637 is set. This indicates that the calling party on this call is both a facsimile unit, i.e., Telecopier, and is in the send mode. With the verify flip-flop 637 being set, the disconnect timer 217 is disabled, allowing the coupler to begin looking for the carrier detect signal. The carrier detect signal causes the transceiver in the print mode to start up and begin printing upon receipt of data information. Carrier detect is determined in the disconnect logic 10 by circuitry comprising gates 101, 103, delay 105, and the level changer 107 to change the data signals to the proper level to drive the printing circuits of the transceiver.

The principle behind the carrier detect signal is that the nature of the signals transmitted between Telecopiers is that at least 10 milliseconds of every scan line, which is 330 milliseconds long, will be transmitted as white during the backstroke time. Thus, after every scan line 10 milliseconds of white information is transmitted which is detected by the 1,500-cycle detector 305 in the first limiter circuit 30. The output of the 1,500-cycle detector 305 is passed to gate 103 in the disconnect logic 10. It is gated with the verify signal, the fact that the 1,100-cycle signal is not there, and the fact that this location is not transmitting a beep tone because when such a beep tone is transmitted, the tone is 1,500 cycles and it is not desirable to detect this location's own 1,500-cycle signal. Delay 105 is arranged that it will trigger if it sees the 1,500-cycle backstroke white signal for about 5 milliseconds or half the duration of the backstroke signal. The delay 105 upon enabling will stay on for approximately 600 to 800 milliseconds. Thus, if the back signal is detected, a binary one level appears at the output of delay 105 which is transferred to the transceiver as carrier detect. Inasmuch as a scan line is 330 milliseconds, the fact that the delay is on for 600 to 800 milliseconds allows for the backstroke white detection at every scan line of information for the carrier detect signal. The carrier detect signal transferred to the transceiver causes the transceiver logic to start up the motors and the scanner and paper drives begin operation and the machine starts printing. That is, the incoming information is begun to be printed out as a facsimile document.

The incoming data information is received at plug 73 and through terminal board 74 is transferred to line transformer 71. The output of the line transformer 71 is transferred back to terminal 10 of terminal board 74, through terminal 9 to 600-ohm impedance-matching pad 509. If desired, the 600 to 900-ohm impedance-matching pad 511 of different predetermined impedance could have been chosen by merely moving the shorting patch from terminal 9 to terminal 11 of terminal board 74. The signal after passing through impedance matching pad 509 passes to terminal 6 which through the shorting lead passes through terminal 7 back to filter 507. The output of the filter drives the mixer 503, which sends this signal the receive equalizer 40. In a transmit mode, as hereinafter more fully described, mixer 503 directs signals from amplifier 501 to filter 507. In this case, since the coupler is looking for the receive equalizer 40. The signal is amplified by amplifier 401, and transferred to phase equalizer 403 which tries to adjust for the average delay that is found in the 1,100distance -cycle telephone lines. The output of the phase equalizer 403 drives an amplitude equalizer 405 which corrects for amplitude variations. From the amplitude equalizer 405, the signals are transferred to a harmonic trap 407, which is designed to eliminate the second harmonic distortion which is introduced onto the line due to acoustic coupling. The signal is amplified again by amplifier 409 and driven into the first limiter 30 to the limiter 301 which squares up the signal to give a constant amplitude square wave for application to the transceiver through jack 11.

At the same time, the output of the first limiter 301 is tapped to look for the 1,100 -cycle 1,500-cycle tones necessary for the correct operation of the system. Thus, the data - cycle is being printed at the transceiver machine as the carrier detect signal is generated by the receipt of the 1,500-cycle backstroke white signal. When the incoming document ends, the transmitting machine sends out its 1,100-cycle stop tone which is detected by detector 307. The 1,100-cycle signal is transferred through the NAND gate 11 directly to the delay 15 and resets it immediately in order that as soon as the detected stop tone is received, carrier detect is lost without the normal 600 to 800millisecond delay. With the loss of carrier detect, the receive transceiver machine stops printing.

With the received document having been printed, the next sequence is to disconnect the coupler from the telephone line and return to the automatic receive state. In order to disconnect, an absence of both carrier detect and 1,100-cycle detect signal is necessary, such that if the coupler continually receives the 1,100-cycle signal, the coupler will stay on line inasmuch as a second document may be coming from the same transmitting location. The disconnect logic itself comprises gate 113, delay 115, gate 117, and delay 119. The gated delay 113 and 115 detects the absence of the stop tone signal from detector 307 and the loss of carrier detect inasmuch as not carrier detect is received at the gate 113 through inverter gate 109. AND gate 113 is anding together the not stop tone signal, not carrier detect, and the verification signal, together with the not send signal indicating that the coupler is in the receive mode. The output from gate 113 energizes delay 115 for approximately a half-second delay which indicates that the condition of not carrier detect and not 1,100 -cycle detect for sufficient time to be sure that both signals are actually absent.

After the half-second delay, timer 119 through gate 117 is fired for approximately a 6 second delay. When timer 119 is fired, gate 121 is enabled which generates a signal to the verify logic 60 to fire one shot 607. One shot 607 generates the one second signal which would try to hold or pull in the relay in the holding circuit 711 in the line terminator 70 as hereinbefore described, but this portion of the circuitry is now disabled by the fact that the verify flip-flop 637 is set, thereby disabling gate 707. The one shot 607 times out as before and fires one shot 611. During this time, one shot 611 once again sends out the beep tone signal through gate 620. The output of that one shot is fed again into gate 121 in a closed loop arrangement so that one shot 607 and one shot 611 become an oscillator. Thus, when one shot 611 has timed out, one shot 607 is fired again. This happens about three times, at which time the 6 seconds from delay 119 and the disconnect logic 10 has elapsed. Gate 121 is no longer enabled, thereby breaking the closed loop of one shots 607 and 611.

To this point three 1,500-cycle beep tones have been transmitted back to the transmitting transceiver unit, the oscillator being stopped with the timer 119 timing out. The data latch comprising gates 201 and 203 are reset, which transfers the telephone lines back to the telephone by means of relay 705.

With the transfer of the line back to the telephone the coupler is disconnected from the telephone line and the coupler and transceiver remain in the automatic receive mode.

Inasmuch as another call from the same or different location could be made to the automatic receiving Telecopier, it is necessary to see whether or not the transceiver is still loaded with sufficient paper for printing out additional documents. The paper interlock at the transceiver will, if paper exists in the machine transmit the necessary signal level to the input of level change 619. If blank paper remains in the machine, the coupler remains enabled for another receive operation. If, however, the receiving transceiver is out of paper, the automatic flip-flop 227 is reset through gate 209 which disables the transceiver from answering another call. If there is still paper in the machine, the coupler will answer another call and print out the document through the same sequence as was hereinabove set forth.

For an automatic transmit operation, as when an operator has set a document into the transceiver for later transmission at a time when the rates are cheaper, for example, similar conditions are needed for the automatic transmission of said document. The machine is thus loaded with the document and the door closed. Thus, a high-level signal again appears on the platen interlock switch line and a high-level signal appears on the send-receive lead. The fact that the platen interlock switch is closed allows the data latch comprising gates 201 and 203 to be set and the same sequence as in the receive mode is followed. Thus, a ring is detected, the data latch is pulled in, the line is transferred to the coupler, and the line holding circuit is pulled in through line holding circuit 711 and transformer 71. At this point, one shot 607 in the verify logic 60 has been fired, and when it times out after the one second signal fires one shot 611. As the system is now in the send mode instead of the receive mode, not only is the interlock switch 623 pulled in but the platen interlock switch lead is forced to look like it has no paper which when transferred to the transmitting transceiver causes a stop tone signal of 1,100 cycles to be transferred to the receiving transceiver unit at the remote location. This signal is transmitted just for the duration of the one shot 611 so that a 1,100-cycle tone is transmitted to the receiving transceiver indicative of the send mode rather than the 1,500-cycle tone indicative of the receive mode.

Disconnect timer 217 is again fired for the 10-second to 2-minute adjustable delay which is looking for the verification signal back from the remote transceiver location. To get verification now that the coupler is in the send mode instead of the receive mode, gate 629 in the verify logic 60 is enabled instead of gate 631 as in the receive mode. Thus, if the coupler receives a 1,500-cycle signal on the line, after the 300 -millisecond delay by delay 635, the verify flip-flop 637 will be set to reset the disconnect timer 217. With the verify flip-flop 617 set, the interlock switch 623 is permanently pulled in through gate 603 and gate 621 as it did in the receive mode. As the coupler is now in the send mode, generating the interlock signal is sufficient to cause the transceiver motors to run and cause the document loaded therein to be transmitted.

The video information from the document passes through terminal board 11 to the input to transmit amplifier 501. The data appearing here is the phasing signal necessary for synchronization of the transmitting and receiving scanners, followed by the input information from the document. The signals are amplified through amplifier 501 to a predetermined level which is set by the gain circuit 505 by proper switching of the shorting lead on terminal 3 to either terminal 1, 2, 4, or 5. After the gain circuit 505, the information passes through mixer 503 drives the filter 507 and through the proper impedance matching pad 509 or 511 drives the primary of the line transformer 71. The information is transferred through the line relay 705 through terminal board 74 to plug 73 to the telephone line and to the receiving transceiver location.

At the end of the transmission of the document, the transceiver and the coupler must be removed from the telephone line, as no more than the one document can be transmitted in the unattended mode. When the document is finished being transmitted, NAND gate 211 has all high levels on the input thereof. It is gating together the fact that there is no more paper in the machine, the fact that the system is in the transmit or send mode, and that the system is also in the automatic mode. In addition, when the document has been completed, gate 111 in the disconnect logic 10 now has all high-level inputs applied to it. With all high-level inputs to gate 111, the output thereof is at a low level which is applied to gate 117, thereby firing timer 119 for 6 seconds to start the disconnect process as hereinbefore set forth. However, this time the gate 121 is not enabled to form the oscillator thereby sending out the beep tones since gate 121 is disabled by the send lead actually indicating the not send condition. Therefore, rather than sending out the three 1,500 -cycle beep tones, the 1,100-cycle stop tone is continuously transmitted which causes the transceiver machine at the other location to stop and idle for approximately 6 seconds. At the end of that time, timer 119 times out, resets the data latch comprising gates 201 and 203 through the not disconnect line and thus the line is transferred back to the telephone thereby disconnecting the coupler from the telephone line. Since the document in the send mode has been transmitted, no more paper exists in the transceiver, and therefore the gate 209 resets the automatic flip-flop 227 to prevent the coupler from answering another telephone call. If an operator is not present at the location, another call will merely ring at the receive telephone until the caller determines that nobody is present or that the transceiver is no longer on the line and hangs up at his end.

The third mode, which is provided by the coupler, is when an operator is present at both locations and are in voice contact with each other by means of the telephones coupled to the couplers at each of the transceiver locations. If, through the voice communication, it is desired tq transmit a document, the data button 23 would be manually depressed which causes the same operation to commence that a incoming ring detected by ring detector 701 would cause to happen.

With the depression of the data button 23, the data latch 201 and 203 is set, thereby firing one shot 607, and the coupler goes through the entire process of pulling in the telephone line, sending out a beep tone and stopping and waiting for verification as was hereinabove set forth. At this point, therefore, the coupler receives the verification signal and transmits the document to the receiving location. When the document has been completely transmitted, more than one document may be transmitted inasmuch as an operator is present at the transmitting location. Thus, rather than disconnecting or returning the telephone to the line immediately after transmitting the document, gate 211 in the answer logic 20 becomes enabled by the fact that the system is not in the auto mode, paper has been lost and the system is in the send mode. The situation starts the disconnect timer 217 for the 10-second to 2-minute predetermined delay. This delay gives an operator at the transmitting location this much time to load another document before the coupler will automatically disconnect from the line and transfer back to the telephone. If another document is loaded onto the transceiver in that time, the paper switch notes that a document is present and the disconnect timer 217 is disabled and the document is transmitted. If the document is not loaded within the predetermined time period, timer 217 times out and returns the connection to the telephone in the same way be resetting the data latch as was hereinbefore described. Otherwise the sequence is exactly the same as an automatic transmit sequence described above.

For a manual receive, i.e., when an operator decides to manually receive a document by reason of the voice communication between the locations, the data button is depressed, the line is transferred to the coupler, pulled in by the line holding circuit 711, the beep tone is transmitted to the other location and the coupler waits for verification. When verification is received that another compatible Telecopier is at the other location, the coupler begins looking for the carrier detect signal indicating that the 10 milliseconds of backstroke white information is being transmitted over the telephone line. The document is printed out in the same sequence as the automatic receive.

While the transceiver is receiving through the coupler in the receive mode, in effect it does not matter whether or not there is an operator present. The control belongs to the operator at the transmitting location. Thus, the operator at the receiving location merely sits back and watches the receipt of the transmitted document. The logic conditions at the end of receiving a document are exactly the same in the manual or automatic modes. That is, the coupler looks for the loss of both carrier detect signal and the 1,100-cycle stop tone signal. When this condition is detected, the beep tones are transmitted back to the transmitting transceiver and the line is transferred back to the telephone. Since the operator has physically removed the telephone from its cradle, the line is not lost, i.e., not hung up, and another receive or transmit operation can be commenced by the manual setting of the data switch and transmit and receive functions.

If during the manual transmission or receiving of a document, control is desired back to the operator, as for example when a higher priority document is desired to be transmitted, the talk button is depressed. This action causes the automatic flip-flop 227 to be reset, thereby initiating the disconnect sequence and returns the telephone line to the telephone from the coupler. Thus, in the morning after the system has been in the automatic mode overnight, for example, the automatic mode can be cleared by depressing the talk button. If the system is in the data mode, as for example when the operator manually desires to transmit or receive a document, and audio communication over the telephone line is desired, the talk button is depressed and communication is returned to the telephone. Thus, the talk button is an override command on the entire system so that the telephone can be put back on the line at any time desired by the operator.

While the buttons can be manually depressed at any time by an operator, the transmit and receive operations can be initiated. That is, the data mode can be entered only if paper is in the machine and it is loaded. Thus, pushing the data button with the cover open on the machine would cause absolutely nothing to happen as far as data transmission is concerned. In addition, the automatic mode can be entered only when the system is not in the data mode. That is, if a call is being made and the data mode has already been entered, the automatic mode cannot be switched to allow the operator to leave before the end of the communication. Even if the automatic button was depressed during the data mode, the coupler will automatically disconnect from the line. However, if the coupler is in the automatic mode, the data mode may be entered by merely depressing the data button.

In the foregoing, there has been disclosed methods and apparatus for allowing unattended operation of a transceiver system over a direct distance dialing telephone communication lines. While the disclosed circuits have been described in conjunction with specific logic circuitry, such circuitry is exemplary only as other circuits and apparatus could be utilized to perform the disclosed functions. For instance, negative logic is utilized herein, but it is obvious that positive logic can also be utilized without deviating from the principles of the present invention. In addition, the foregoing system has been shown and described in conjunction with a Telecopier facsimile-transceiving system in conjunction with the direct distance dialing common carrier telephone lines. It is apparent, however, that other facsimile or graphic communication systems could be utilized with other transmission media without deviating from the principles of the disclosed and described invention. Thus, while the present invention as to its objects and advantages, as described herein, has been set forth as specific embodiments thereof, they are to be understood as illustrative only and not limiting.

What is claimed is:

1. An electronic coupler for coupling a facsimile transceiver means to a transmission line means, said electronic coupler providing an automatic unattended transmit and receive capability for said facsimile transceiver means, comprising line terminator means coupled to said transmission line means for detecting the receipt of a message call from a similar remote facsimile transceiver means, verify logic means coupled to said line terminator means for verifying that said remote facsimile transceiver means is on the line and in the correct operational mode to communicate with said local facsimile transceiver means, answer logic means coupled to said verify logic means for determining the operation mode of said electronic coupler and for generating functional signals in accordance with said operational mode, first detector means for detecting a received signal of a first frequency indicative of the operation of said remote facsimile transceiver means in the transmit mode and the presence and correct operating mode of said remote facsimile transceiver means in the receive mode, second detector means for detecting a received signal of a second frequency indicative of the presence and correct operating mode of said remote facsimile transceiver means in the transmit mode and of the end of a transmitted document respectively, and disconnect logic means coupled to said verify logic means, said answer logic means and said first and second detector means for disconnecting said electronic coupler from said transmission line means upon the predetermined selective occurrence and absence of said first and second frequency signals.

2. The electronic coupler as set forth in claim 1, further including transmit amplifier means for amplifying facsimile information to be transmitted to the level compatible with the operation of said transmission line means and impedance matching means for providing amplitude, phase, and harmonic distortion equalization for received facsimile information.

3. The electronic coupler as set forth in claim 2, wherein said transmission line means is a common carrier telephone line with telephone means at both ends thereon, and wherein said line terminator means further includes ring detector means coupled to said telephone line for detecting the presence of ring current on said line, switch means coupled to said answer logic means for switching said telephone line from said telephone means to said electronic coupler, line-holding circuit means coupled to said verify logic circuit means for holding said telephone line at said electronic coupler upon verification of said remote facsimile transceiver means, said line-holding circuit returning said telephone line to said telephone means upon receipt of a disconnect condition and external manual control, respectively. 25

4. The electronic coupler as set forth in claim 3, further including auto-switch means coupled to said answer logic means for placing said electronic coupler in the automatic operation mode, data-switch means coupled to said answer logic means for placing said electronic coupler in the manual operation mode, and talk-switch means coupled to said answer logic means for placing said electronic coupler in the talk operation mode, thereupon said electronic coupler being removed from the automatic mode and data modes respectively.

5. An electronic coupler for automatically coupling an unattended facsimile system means to a transmission line means, comprising first means coupled to said transmission line means for detecting the receipt of an incoming message call, second means coupled to said first means for verifying that said message call initiated by a similar facsimile system means in an operational mode compatible with said facsimile system means, third means for detecting a received signal of a first frequency from said similar facsimile system means, fourth means for detecting a received signal of a second frequency from said similar facsimile system means, and fifth means coupled to said first, second, third, and fourth means for disconnecting said electronic coupler from said transmission line means upon the predetermined selective occurrence and absence of said first and second frequency signals.

6. The electronic coupler as set forth in claim 5 further including sixth means coupled to said second means for determining the operational mode of said facsimile system means, and wherein said received first frequency signal is indicative of the operation of said similar facsimile system means in the transmit mode and the presence and compatible operating mode of said similar facsimile means in the receive mode, and wherein said received second frequency signal is indicative of the presence and compatible operating mode of said similar facsimile system means in the transmit mode and of the end of a transmitted document.

7. The electronic coupler as set forth in claim 6, further including seventh means for amplifying facsimile information to be transmitted to a level compatible with operation of said transmission line means, and eighth means for providing impedance matching and equalization for received facsimile information.

8. The coupler set forth in claim 6, wherein said first means includes means for disabling said electronic coupler upon detection that said unattended facsimile system is unable to effectively transmit or receive said facsimile information over said transmission line means.

PO-1050
(5/69)

UNITED STATES PATENT OFFICE
CERTIFICATE OF CORRECTION

Patent No. 3,609,241 Dated September 28, 1971

Inventor(s) Alton F. Riethmeier

It is certified that error appears in the above-identified patent and that said Letters Patent are hereby corrected as shown below:

Column 10, line 13, "operation" should be --operational--.

Column 11, line 2, after "call" insert --was--.

Signed and sealed this 7th day of March 1972.

(SEAL)
Attest:

EDWARD M.FLETCHER,JR.
Attesting Officer

ROBERT GOTTSCHALK
Commissioner of Patents